July 7, 1970     D. F. MURRAY     3,519,138

SPECTACLE RACK

Filed April 12, 1968

INVENTOR.
Donald F. Murray
BY
Richard D. Law
ATTORNEY

United States Patent Office 3,519,138
Patented July 7, 1970

3,519,138
SPECTACLE RACK
Donald F. Murray, 1822 Warren Ave.,
Cheyenne, Wyo. 82001
Filed Apr. 12, 1968, Ser. No. 720,928
Int. Cl. A47f 7/02
U.S. Cl. 211—13                                   7 Claims

ABSTRACT OF THE DISCLOSURE

A rack designed to hold open spectacles consists of a tilted cradle mounted on a base for keeping the lenses away from the sides thus providing protection from scratching. The cradle is lined with foamed plastic or similar soft textured surface serving as an added cushioning protection to the lenses.

---

Among the objects and advantages of the invention is a new structure for holding spectacles in an open position when not in use in such a manner as to protect the lenses from being scratched on contact with the body of the holder, and to prevent undue wear on the spectacle hinges from opening and closing the bows.

Another object of the invention is to allow the spectacles to rest in the holder without falling forward.

These two objects are generally achieved by mounting the pocket, which holds the spectacles, at an angle on a base so it is tilted allowing the spectacles to rest in the holder without falling forward and at the same time keeping the lenses away from the sides which prevents from scratching.

These and other objects and advantages of the invention may be readily ascertained by referring to the following description and appended illustrations which:

Figures 1, 2, 3:
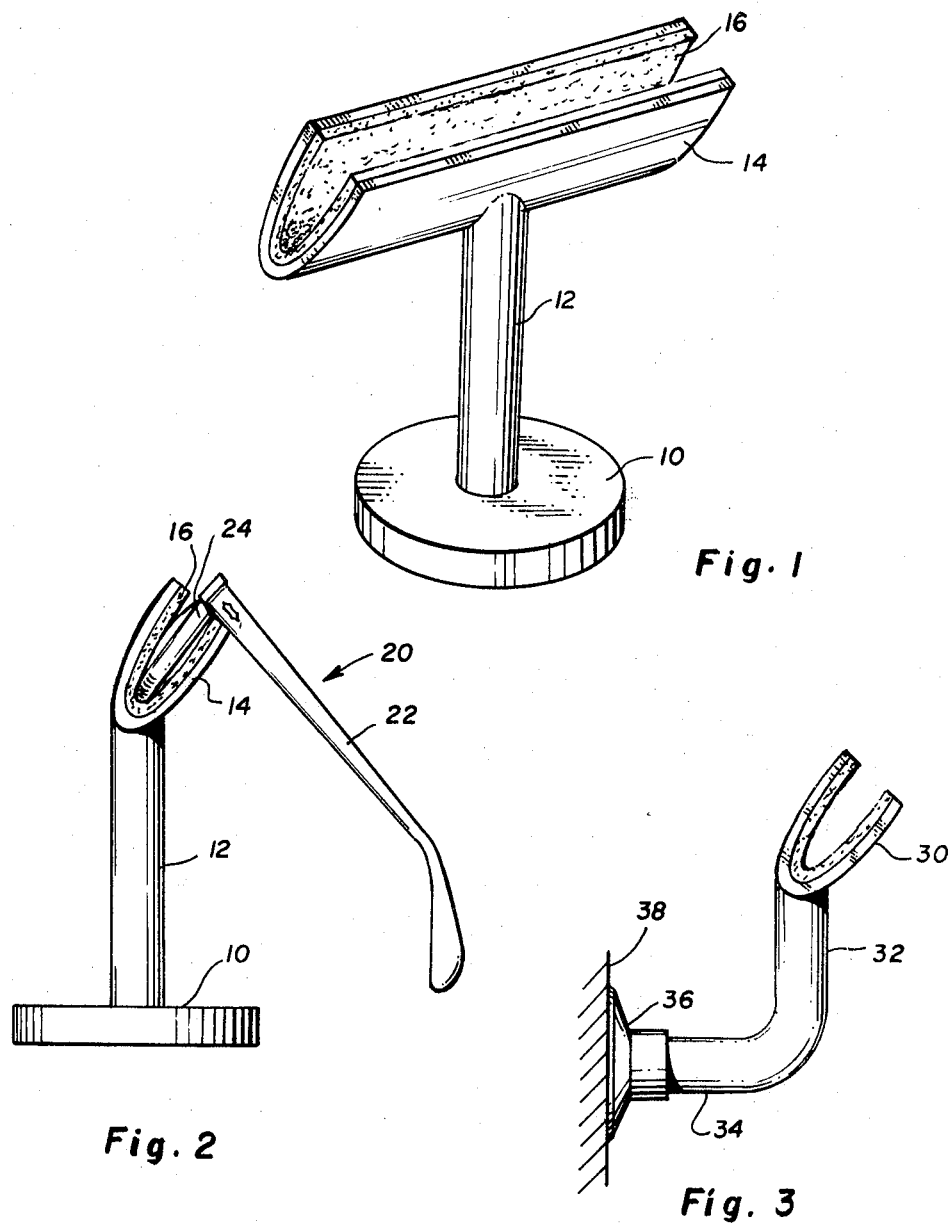
FIG. 1 is a perspective view of a spectacle holder pedestal mounted illustrating the tilted pocket lined with foamed plastic.
FIG. 2 is a side elevational, detail view of the holder illustrating opened spectacles resting in the pocket at an angle arranged for keeping the lens from resting directly on the holder.
FIG. 3 is a side view of another form of the invention, mounted for attachment to a wall in an upright position by means of a suction cup.

In the device selected for illustration in FIGS. 1 and 2, the invention includes a disc shaped base 10, which may be rectangular, triangular or other desired shape. An upright stem 12, serves as a pedestal on which a spectacle pocket 14 is mounted. The spectacle pocket is a semifolded cradle mounted on the stem in a tilted position, and it is fully lined with thin sheets of foamed plastic 16.

The base, stem and pocket may be made of plastic, wood or any other appropriate material. The length of the pocket is sufficient to hold most spectacles with their bows open. This, of course, means that it is less than the distance between the hinges for the bows on the spectacle frame.

The pocket or spectacle holder is arranged over the stem of the holder in such a manner that the center of gravity of the open spectacles in the holder is approximately over the stem which resists a tendency of the holder and spectacles to tip. The base may be made larger or smaller depending on the desires of the user. The holder may be made ornate to fit the decor of a bedroom, bathroom, or other places where spectacles are frequently removed and placed in position of safety.

FIG. 2 illustrates an open pair of spectacles 20 resting in the tilted pocket. The bows 22 are open and the lens frame 24 is in a secure position. The configuration keeps the spectacles from falling forward and keeps the front of the lens away from the side. Since the lenses are convex outwardly, there is little chance that the inner side of the lens will touch the holder.

In the device illustrated in FIG. 3, a pocket 30, similar to that of FIG. 1, is mounted on a wall bracket, which includes an upright stem 32 and a joining horizontal member 34 ending with a suction cup 36. The cup when pressed against a wall 38 keeps the holder standing in a vertical position away from the wall. This permits the spectacles to rest in the cradle in the same manner and offering the same protection as in FIGS. 1 and 2. The cradle support of the device of FIG. 3 and horizontal portions may be separable. Also, in place of the suction cup, a permanent wall mounted base may be used.

Each of the holders described above hold the spectacles in open position. This negates the opening and closing of the bows, and consequent wear on the hinges, which are easily loosened. In each case the spectacles are held in such a position that the lenses do not rest on a surface. Even with soft surfaces, harder foreign matter may become lodged on it and scratch the lens. Plastic lenses, such as found in many sunglasses are particularly susceptible to scratching, and the holder provides means for preventing it.

I claim:

1. A spectacle holder for temporarily holding a pair of open spectacles comprising:
   (a) base means;
   (b) support means extending upwardly from said base means;
   (c) a sheet of material reversed on itself forming a semi-folded pocket mounted generally upright on said support means with its plane of symmetry passing longitudinally through said pocket at an angle from the vertical when said holder is mounted for use; and
   (d) resilient means completely lining said pocket to prevent scratching the lenses of said spectacles.

2. A spectacle holder according to claim 1, wherein the angle of said plane of symmetry is sufficiently great so that both side walls of said pocket are at an angle to the vertical to prevent a pair of open spectacles resting in said pocket from tilting forward on the front of the spectacle lenses.

3. A spectacle holder according to claim 1 wherein said base is proportioned to rest on a horizontal surface and maintain said pocket in said general upright position.

4. A spectacle holder according to claim 1 wherein said base and support means are integral.

5. A spectacle holder according to claim 1 wherein said base is a disc.

6. A spectacle holder according to claim 1 wherein said base includes means for attachment to a vertical surface, and said support means includes a horizontal portion attached to said base means and a vertical portion attached to said pocket.

7. A spectacle holder according to claim 6 wherein said support means portion are integral.

References Cited

UNITED STATES PATENTS

| | | |
|---|---|---|
| 1,686,002 | 10/1928 | Herzon. |
| 1,710,847 | 4/1929 | Thursby. |
| 2,411,361 | 11/1946 | Bongiovanni. |
| 2,467,251 | 4/1949 | Bowman. |
| 2,884,220 | 4/1959 | Manley _____ 248—309 |
| 2,958,495 | 11/1960 | Foster _____ 248—309 X |
| 3,291,429 | 12/1966 | Neanhouse _____ 248—309 X |

DAVID H. BROWN, Primary Examiner

U.S. Cl. X.R.

248—309, 451